Oct. 2, 1956 J. M. McGREW 2,765,193
DUMP TRAILER

Filed Oct. 11, 1952 5 Sheets-Sheet 3

INVENTOR,
John M. McGrew.
BY
Hamilton & Hamilton,
Attorneys.

Oct. 2, 1956  J. M. McGREW  2,765,193
DUMP TRAILER

Filed Oct. 11, 1952  5 Sheets-Sheet 4

INVENTOR,
John M. McGrew.
BY
Hamilton & Hamilton,
Attorneys.

Oct. 2, 1956 J. M. McGREW 2,765,193
DUMP TRAILER
Filed Oct. 11, 1952 5 Sheets-Sheet 5
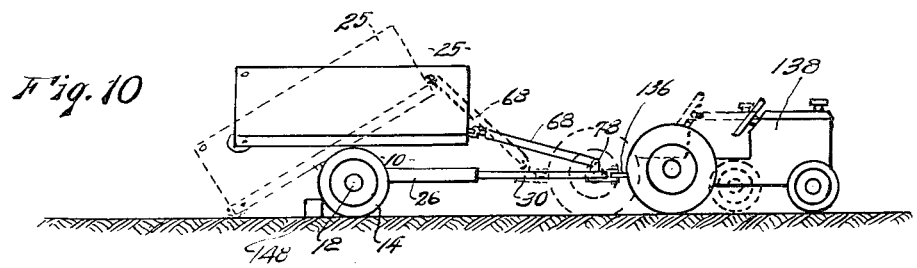
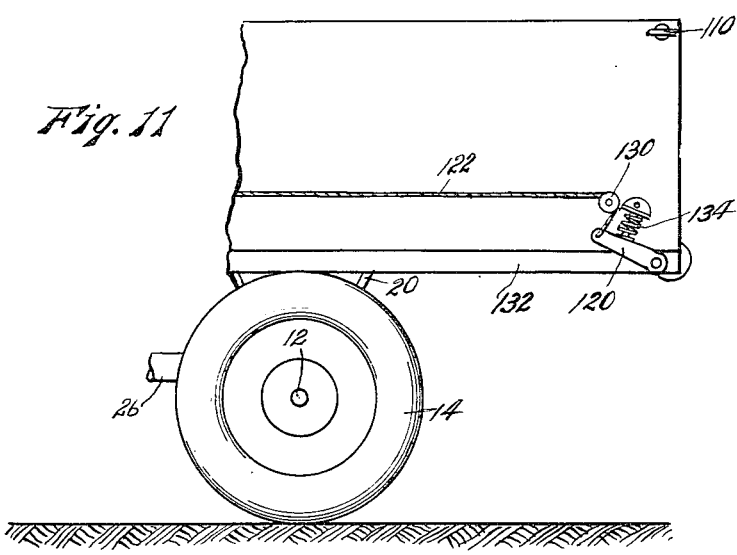
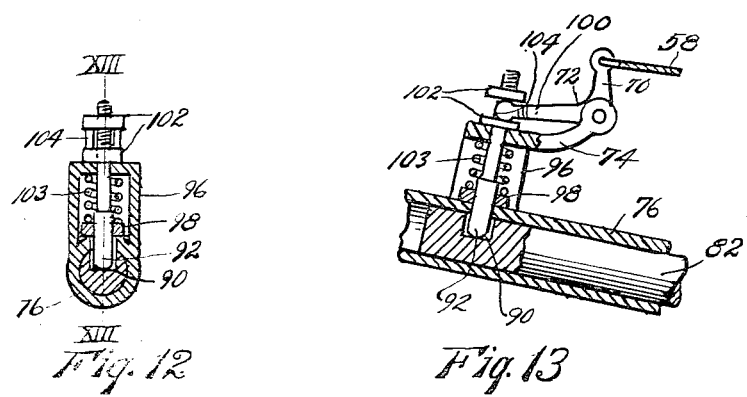
INVENTOR,
John M. McGrew.
BY Hamilton & Hamilton
Attorneys.

United States Patent Office 2,765,193
Patented Oct. 2, 1956

2,765,193

DUMP TRAILER

John M. McGrew, Esbon, Kans.

Application October 11, 1952, Serial No. 314,387

4 Claims. (Cl. 298—20)

This invention relates to improvements in dump trailers, and has as its principal object the provision of a trailer adapted to be dumped by the movement of the pulling tractor relative to the trailer when the trailer is positioned against a stop member.

Another object of the present invention is the provision of a dump trailer so mounted on a running gear that it can always be moved to an overbalanced position, whereby the load will be dumped automatically.

Other objects are simplicity and economy of construction, ease and efficiency of operation, and adaptability for use with any of the usual types of farm tractors having a drawbar.

With these objects in view, as wel as other objects which will appear in the course of the specification, reference will be had to the drawing, wherein:

Fig. 4 is a fragmentary rear view of the trailer showing the end gate latching means and associated parts.

Fig. 5 is an enlarged cross-sectional view taken on line V—V of Fig. 2.

Fig. 6 is a sectional view taken on line VI—VI of Fig. 5.

Fig. 10 is another diagrammatic view showing the trailer and tractor on the level ground in solid lines and in dotted lines in the lowered position for receiving a load of stock from the ground.

Fig. 11 is a fragmentary left side elevation of the trailer showing the end gate latching means.

Fig. 12 is an enlarged sectional view taken on line XII—XII of Fig. 2.

Fig. 13 is a sectional view taken on line XIII—XIII of Fig. 13.

Figure 1:
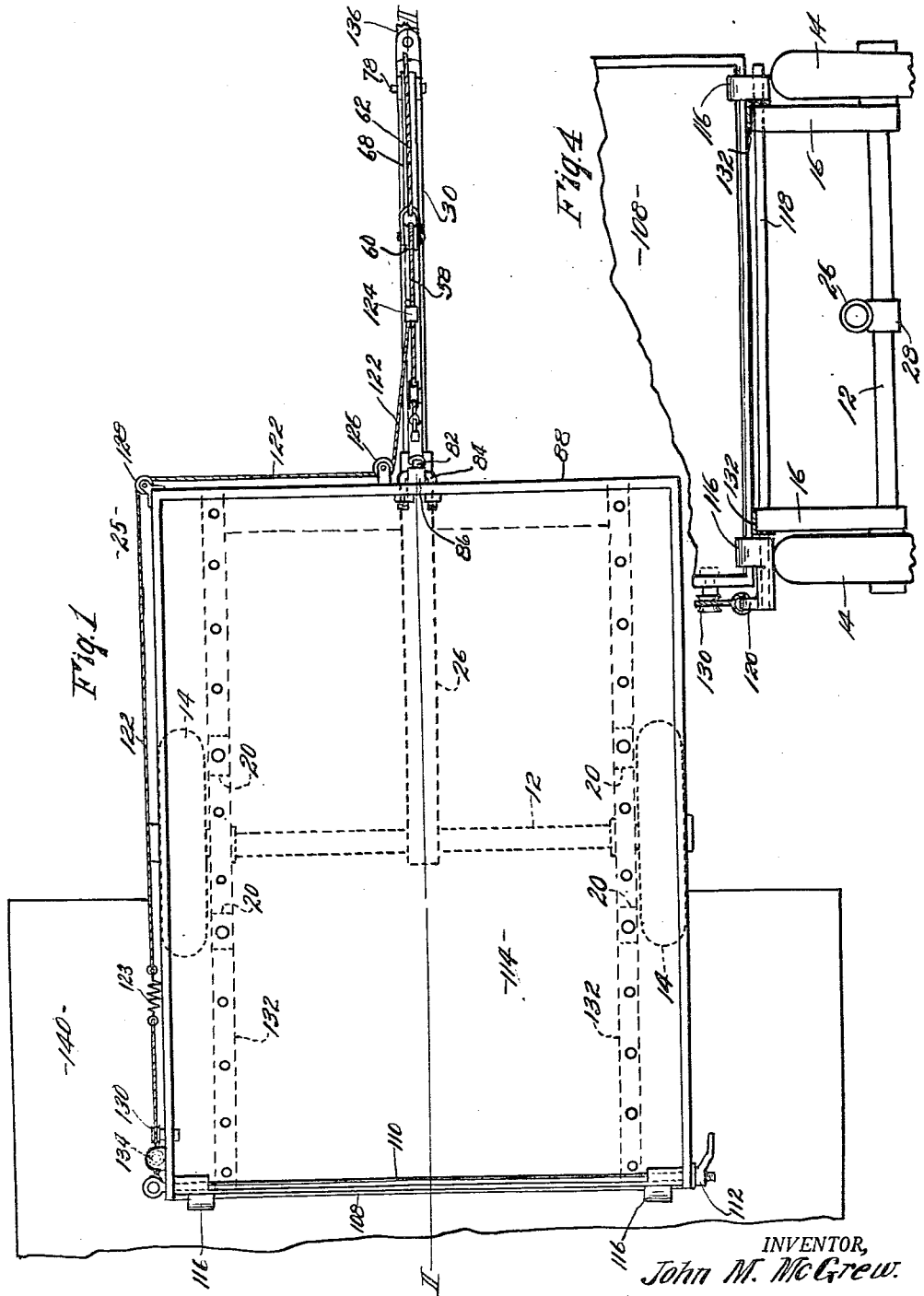
Fig. 1 is a plan view of the trailer shown in position as attached to a tractor, and embodying the present invention.
Figure 2:
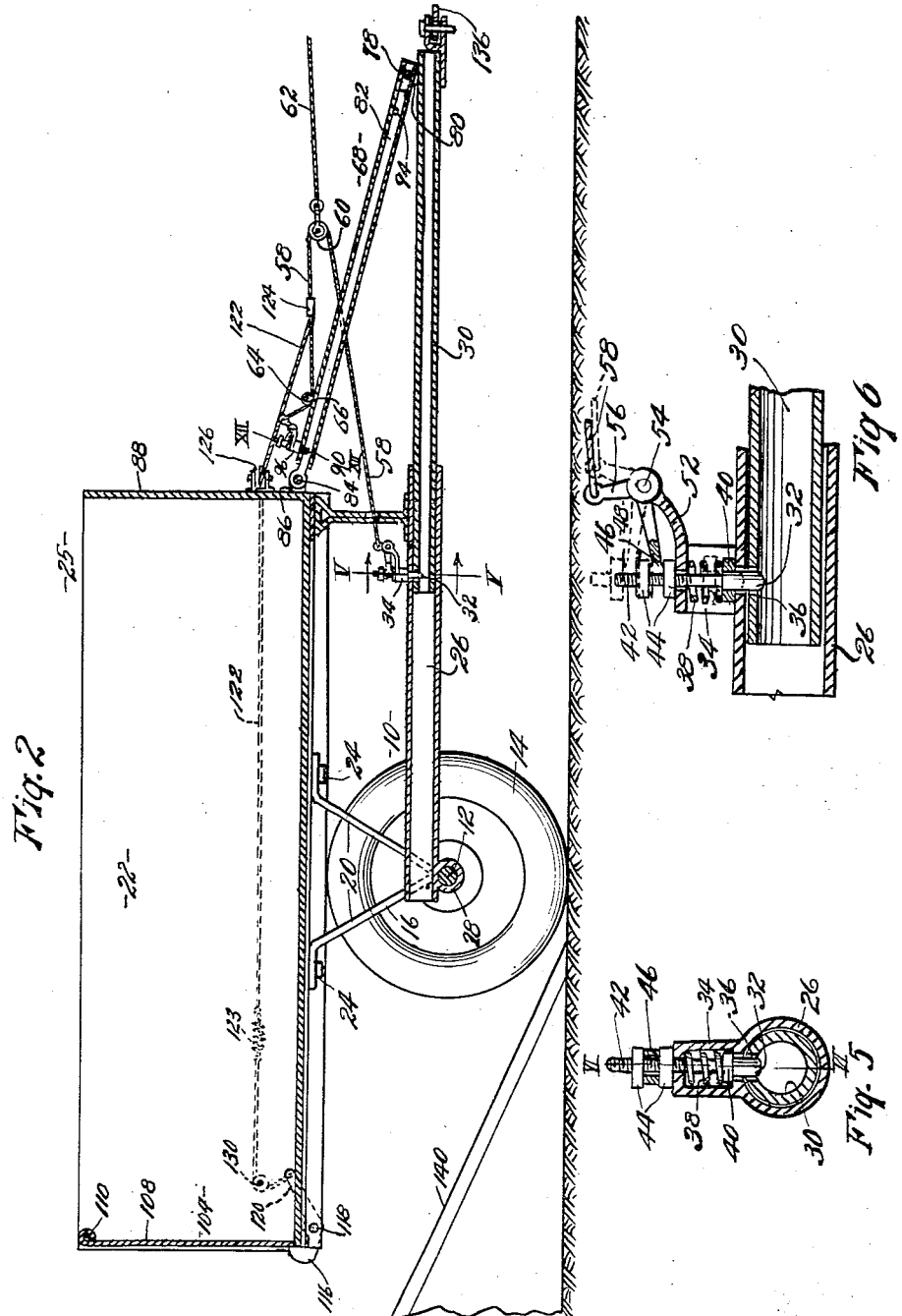
Fig. 2 is a central sectional view of the trailer taken on line II—II of Fig. 1.
Figure 3:
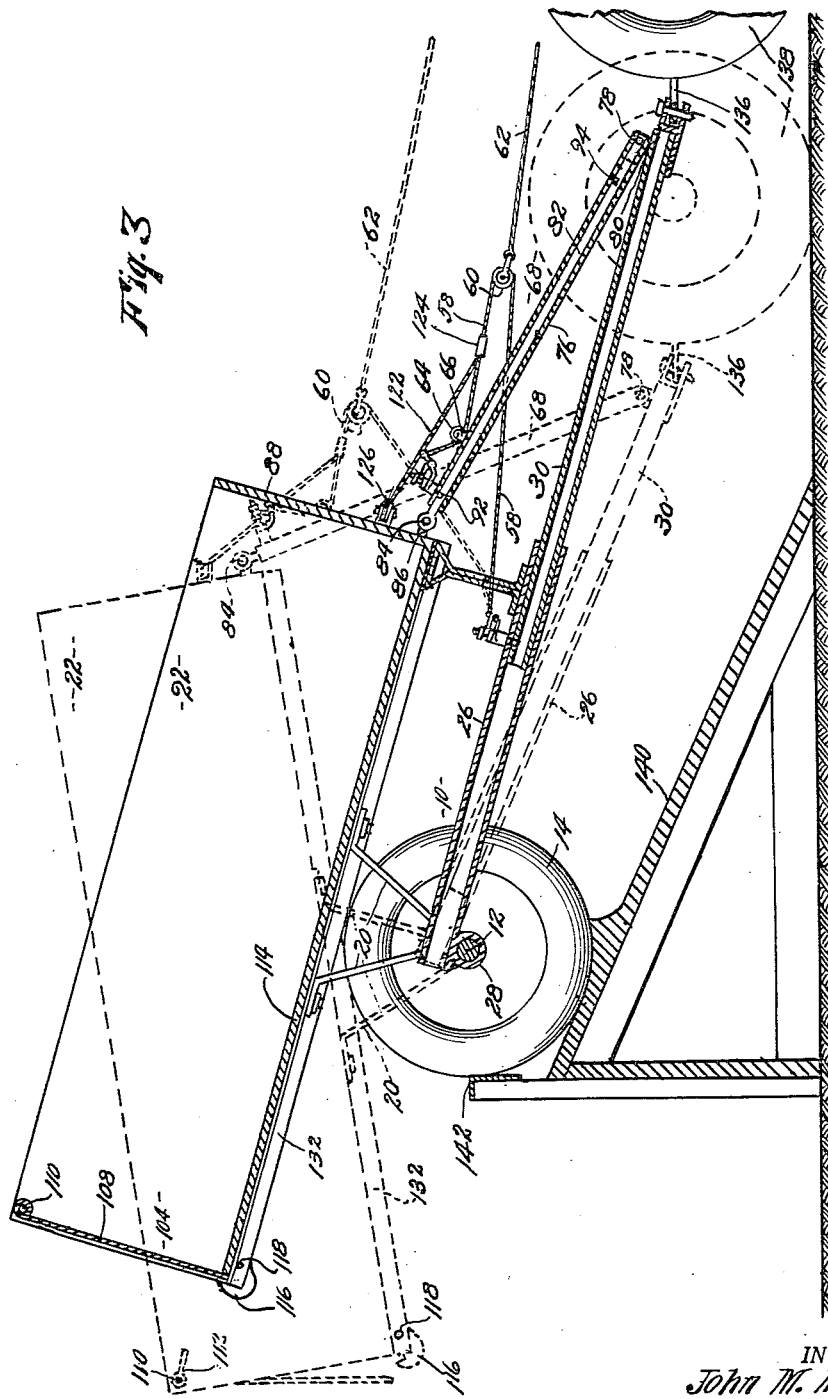
Fig. 3 is a sectional view similar to that shown in Fig. 2, with the rear portion of the trailer shown in a raised position on a ramp or any other similar incline, with the trailer in the non-dumping position in solid lines, and in the tilted dumping position in dotted lines.

Throughout the several views of the drawing like reference numerals apply to similar parts, and the numeral 10 designates a running gear comprising an axle 12 on which are rotatably mounted suitable wheels 14 at each of its opposite ends. Brackets 16, comprising axle bearings 18, are mounted on upwardly diverging arms 20 which are secured to the under side of bed 22 by bolts 24, whereby bed 22 is spaced above axle 12. The bed is balanced when the bed bottom is positioned substantially horizontally, and can be dumped by raising the front end of the bed to rock it about axle 12. When the bed is so operated it will automatically dump the load.

Trailer 25 is provided with a centrally disposed tubular tongue 26 having a depending loop 28 by means of which it is fixedly attached to axle 12. Telescoped into tongue 26 is a slidable extension 30 which when extended is secured against longitudinal movement by means of a detent 32 adjustably mounted on tongue 26 by means of bracket 34. This detent 32 is normally held in position to extend through an opening 36 formed through the wall of tube 30, by means of a compression spring 38 mounted under compression in bracket 34 to rest against a shoulder member 40. The reduced end portion 42 of detent 32 extends outwardly from bracket 34 and is threaded to receive spaced apart nuts 44 to receive the bifurcated end portion of one leg 46 of the bell-crank lever 48 therebetween, whereby the detent 32 may be raised from engagement in opening 36 against the action of compression spring 38 to permit relative movement of tongue members 26 and 30. The bell-crank lever is pivoted intermediate its ends to arm 52 integral with bracket 38 by means of pin 54. The other arm 56 of bell-crank lever 48 is engaged by a pull cord 58, which passes about sheave wheel 60 which is operatively secured to the operating cord 62 which extends to a position adjacent the tractor operator. The other end portion of pull cord 58 passes under sheave wheel 64 rotatably carried by bracket 66 secured to extension bar 68 to engage one arm 70 of bell-crank lever 72 carried by arm 74 which is integral with bracket 96. This extension bar 68 comprises a tubular member 76 pivoted at 78 to a bracket 80 fixed to tongue extension 30. Telescoped into member 76 is an extension member 82 which is pivoted by means of pin 84 at its outer end to bracket 86 fixed to the front end 88 of bed 22. Member 82 is recessed at 90 to receive a detent 92 whereby tubular member 76 and member 82 are normally secured against relative movement. Member 82 is also recessed adjacent its inner end at 94 to receive detent 92 to limit its outward movement from member 76 during the dumping operation. Detent 92 is mounted in a bracket 96 carried by 76 and has a shoulder 98 against which a compression spring 100 rests to urge the detent to the latching position. The reduced upper end of detent 92 is threaded and provided with two spaced apart nuts 102 between which the operating bifurcated end portion 104 of arm 100 of the bell-crank lever 72 operates to raise said detent to the unlatched position against the action of spring 103.

The open rear end 104 of bed 22 is provided with an end gate 108 mounted for swinging movement on an end gate rod 110 extending through the opposite side walls of the bed 22 and secured in position by means of hand nut 112. The lower edge of end gate 108 rests against the bottom member 114 of the bed and is secured against outward swinging motion by means of detents 116 which are secured rigidly to cross rod 118, so that they are movable in unison by means of fixed lever arm 120. An operating cord 122 is secured to pull cord 58 at 124 and passes over sheave wheels 126, 128, and 130, all of which are rotatably mounted on brackets carried by bed body 22. After passing over sheave wheel 130 the cord 122 passes downwardly to engage the end of lever arm 120 whereby said lever is operated as cord 62 is pulled by the operator. The spring 123 in cord 122 facilitates the proper tensioning of detents 116 for proper operation. It will be noted that the reinforcing angle irons 132 are arranged in parallel relation at the bottom of bed 22 to carry the detents 116, which are so constructed as to move in and out of engagement with the end gate as rod 118 is oscillated by the movement of lever arm 120. The lever arm 120 is urged to the latching position by means of the compression spring 134.

Figure 7:
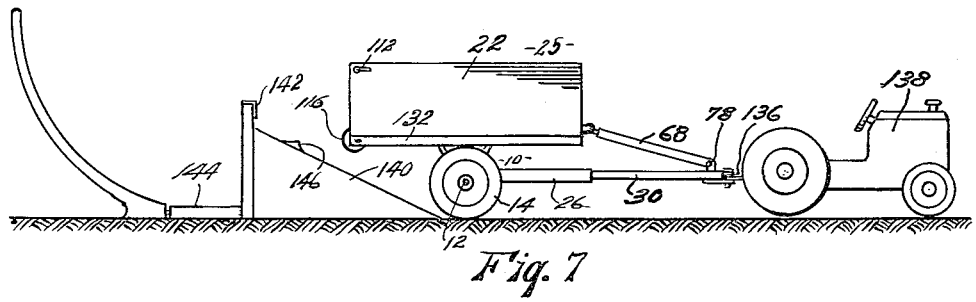
Fig. 7 is a diagrammatic view of the dump trailer shown in operative relation to a tractor and adjacent an elevator conveyor or structure, ready for dumping.
Figure 8:
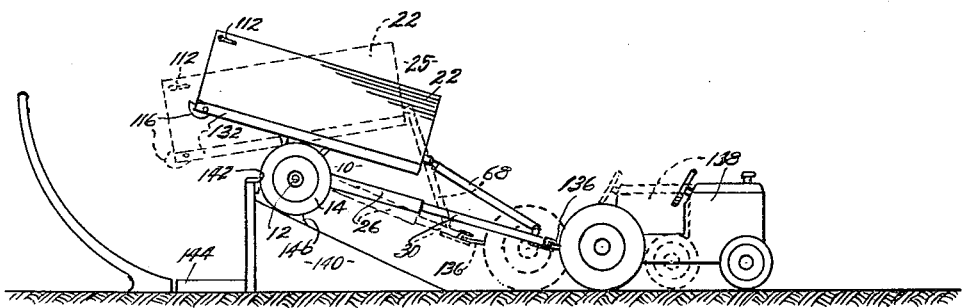
Fig. 8 is a diagrammatic view similar to that shown in Fig. 7 wherein the apparatus is shown with the trailer in position on the conveyor structure in solid lines, and is shown in dotted lines with the trailer bed moved to the overbalanced position for dumping.
Figure 9:
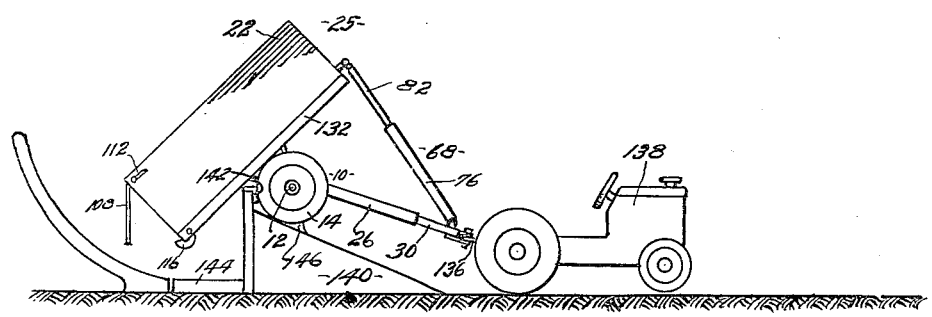
Fig. 9 is a further diagrammatic view showing the trailer bed in the inclined position for dumping.

While this dump trailer is suitable for many uses on the farm, such as loading and unloading stock, machinery and many types of materials, its principal use is for unloading ear corn at the cribs in rapid succession at corn gathering time. This operation is best shown in Figs. 7, 8, and 9. Fig. 7 shows diagrammatically a dump trailer 25 of the type described, attached to the drawbar 136 of a farm tractor 138. It is considered that this trailer has been filled with ear corn by a corn picker and is now ready for unloading at the crib. It has been found convenient to prepare a suitable ramp 140 having a back stop 142. The trailer is first backed onto the ramp to the position shown in solid lines in Fig. 8 on the ramp step 146. The operator now pulls the operating cord 62 to release detents 32, 92, and end gate latches 116, and then backs his tractor to the position shown in dotted lines in Fig. 8. The bed will thereby be tilted slightly rearwardly from the horizontal, and the bed will by gravity automatically move to the position shown in Fig. 9, and the load of corn will be deposited on the conveyor 144, not detailed, whereby it will be elevated to a suitable height to be deposited into a bin or the like. As soon as the corn is dumped the operator can drive his tractor forwardly, and the dump trailer will right itself and the detents automatically re-engage to ready it to receive another load.

When used as shown in Fig. 10 for loading stock from the level ground, a block 148 is placed at the rear of wheels 14 and tractor 138 is backed after the operator has released detents 32 and 92, whereby the bed is tilted rearwardly to cause the rearward end thereof to contact the ground, as shown in dotted lines, so that the stock can be driven into said bed.

Although I have shown and described a specific embodiment of my invention, it is apparent that many minor modifications of structure and operation could be made without departing from the spirit of the invention as defined by the scope of the appended claims.

What I claim as new and desire to protect by Letters Patent is:

1. A dump trailer comprising a running gear having ground engaging wheels carried thereby on a horizontal transverse axis, a bed disposed above said running gear and pivotally connected to said running gear for movement about an axis parallel to the axis of said wheels, a tongue extending forwardly of said bed and including forward and rearward telescoping sections, the rearward section of said tongue being secured to said running gear, means on the forward section of said tongue for securement to a draw bar of a tractor, positive mechanical latching means to secure said forward section of said tongue in its forward position relative to the rearward section of said tongue, a strut pivotally connected at one of its ends to a forward portion of the forward section of said tongue and pivotally connected at its rearward end to said bed at a point spaced above said tongue, and means to release said positive mechanical latching means for securing the forward section of said tongue in its extended position relative to said rearward section to permit said tongue to shorten when the wheels of the trailer are held stationary, and the tractor is moved rearwardly thereby producing a thrust on said strut causing said bed to pivot about its axis and the load on the bed to be discharged.

2. The invention according to claim 1 in which the strut is extendable and latch means are provided for maintaining said strut in its retracted position to maintain said bed in load carrying position with respect to said tongue whereby a load may be towed by a tractor without danger of unintentional discharge.

3. The invention according to claim 2 in which a single control releases the latches for said tongue and said strut.

4. The invention according to claim 1, in which the bed is a dump body provided with an end gate secured by a latch and means are provided to release the latch on said tongue and the latch on said end gate.

References Cited in the file of this patent

UNITED STATES PATENTS

| | | |
|---|---|---|
| 2,148,798 | Barrett | Feb. 28, 1939 |
| 2,686,692 | Hunter et al. | Aug. 17, 1954 |